US012570881B2

(12) United States Patent (10) Patent No.: US 12,570,881 B2

Cao et al. (45) Date of Patent: Mar. 10, 2026

(54) METHOD FOR PREPARING ORGANIC/INORGANIC HYBRID HIGH THERMALLY CONDUCTIVE AND INSULATING TWO-COMPONENT ADHESIVE AND METHOD FOR USING THE SAME

(71) Applicants: Harbin Institute of Technology, Harbin (CN); HIT Zhengzhou Research Institute, Zhengzhou (CN)

(72) Inventors: Wenxin Cao, Harbin (CN); Jiaqi Zhu, Harbin (CN); Ge Gao, Harbin (CN); Yuwei Zhao, Harbin (CN); Zhuochao Wang, Harbin (CN); Kunlong Zhao, Harbin (CN); Yingqi Liu, Harbin (CN); Tianyu Zhang, Harbin (CN); Xiaohui Li, Harbin (CN)

(73) Assignees: Harbin Institute of Technology, Harbin (CN); HIT Zhengzhou Research Institute, Zhengzhou (CN)

( * ) Notice: Subject to any disclaimer, the term of this patent is extended or adjusted under 35 U.S.C. 154(b) by 98 days.

(21) Appl. No.: 18/640,216

(22) Filed: Apr. 19, 2024

(65) Prior Publication Data

US 2024/0352290 A1 Oct. 24, 2024

(30) Foreign Application Priority Data

Apr. 20, 2023 (CN) .......................... 202310427359.6

(51) Int. Cl.
C09J 175/04 (2006.01)
C08G 18/28 (2006.01)
(Continued)

(52) U.S. Cl.
CPC ........ C09J 175/04 (2013.01); C08G 18/2815 (2013.01); C08J 3/02 (2013.01);
(Continued)

(58) Field of Classification Search
None
See application file for complete search history.

(56) References Cited

U.S. PATENT DOCUMENTS 5,591,789 A * 1/1997 Iruvanti ................... C08K 3/01
524/404
2009/0285733 A1* 11/2009 Saha ................. C04B 35/62655
423/127
2015/0197645 A1* 7/2015 Inaba ................... H10F 77/211
427/125

* cited by examiner

*Primary Examiner* — Michael N Orlando
*Assistant Examiner* — Abhishek A Patwardhan
(74) *Attorney, Agent, or Firm* — Fox Rothschild LLP

(57) ABSTRACT

Provided are a method for preparing an organic/inorganic hybrid thermally conductive and insulating two-component adhesive and a method for using the same. The purpose is to solve the problem that thermally conductive adhesives in the prior art cannot meet the requirements of thermal conductivity, good bonding performance and insulation characteristics at the same time. The method includes: 1. preparing an organic phase aluminum dihydrogen phosphate; 2. treating a diamond thermally conductive filler; 3. modifying polyurethane compatible with aluminum dihydrogen phosphate; and 4. preparing an organic/inorganic hybrid insulating two-component adhesive. The use method includes: coating the adhesive onto a surface of a material to be bonded, and bonding; and subjecting a resulting member to be bonded to defoaming, heating, and holding.

10 Claims, 6 Drawing Sheets

(51) Int. Cl.

| | | |
|---|---|---|
| *C08J 3/02* | (2006.01) | |
| *C08J 7/04* | (2020.01) | |
| *C08K 3/04* | (2006.01) | |
| *C08K 3/32* | (2006.01) | |
| *C08K 7/18* | (2006.01) | |
| *C08K 9/02* | (2006.01) | |
| *C09J 5/00* | (2006.01) | |

(52) U.S. Cl.

CPC ............... *C08J 7/0427* (2020.01); *C08K 3/04*
(2013.01); *C08K 3/32* (2013.01); *C08K 7/18*
(2013.01); *C08K 9/02* (2013.01); *C09J 5/00*
(2013.01); *C08G 2170/80* (2013.01); *C08G*
*2330/00* (2013.01); *C08J 2375/04* (2013.01);
*C08K 2003/327* (2013.01); *C08K 2201/001*
(2013.01); *C08K 2201/005* (2013.01); *C09J*
*2475/00* (2013.01)

METHOD FOR PREPARING ORGANIC/INORGANIC HYBRID HIGH THERMALLY CONDUCTIVE AND INSULATING TWO-COMPONENT ADHESIVE AND METHOD FOR USING THE SAME

CROSS REFERENCE TO RELATED APPLICATION

This patent application claims the benefit and priority of Chinese Patent Application No. 202310427359.6 filed with the China National Intellectual Property Administration on Apr. 20, 2023, the disclosure of which is incorporated by reference herein in its entirety as part of the present application.

TECHNICAL FIELD

The present disclosure relates to a method for preparing a thermally conductive and insulating adhesive and a method for using the same.

BACKGROUND

With the development of miniaturization, high integration and multifunction of electronic devices, the heat dissipation of power batteries and chips of new energy vehicles has become a bottleneck restricting the development of the electronic industry. Thermally conductive adhesive is a resin used to bond and conduct heat between components, which has the advantages of high thermal conductivity, good bonding performance and low thermal expansion coefficient, making it possible to achieve a purpose of heat dissipation by fixing a complete thermal management system such as chip, heat sink, refrigerator and radiator. At present, most of the common thermally conductive and insulating adhesives are organic adhesives such as epoxy resin, polyurethane and silicone. Although they have good bonding performance, insulation and adhesion characteristics, there are still the following problems: the resin has a thermal conductivity of only about 0.2 W/m·k to 0.4 W/m·k, which greatly limits its application. At present, the thermal conductivity can be effectively improved by adding a thermally conductive filler to the resin, but the improvement in the thermal conductivity is limited because the thermally conductive filler is still isolated by the resin. At the same time, the increase of the thermally conductive filler is often accompanied by the decline of bonding performance, and the viscosity of the colloid increases significantly, which is contrary to the requirements of high thermal conductivity and strong adhesion of the thermally conductive adhesive. At present, the whole industry has a huge demand for adhesives with thermal conductivity of greater than 2.5 W/m·k and bonding performance of greater than 10 MPa. It is a challenge to achieve both high thermal conductivity and strong bonding performance.

Inorganic adhesives such as aluminum dihydrogen phosphate and silica gel are chemical adhesives composed of inorganic substances such as acid, alkali, salt and inorganic oxides, having an intrinsic thermal conductivity up to 5 W/(m·k), which is much higher than that of organic polymers and shows great potential in thermally conductive and insulating adhesives; thus, the problem of low intrinsic thermal conductivity of the substrate could be easily solved. Although material compositions of the substrate, curing agents, and thermally conductive fillers are very conducive to high thermal conductivity, the high modulus and low strength of inorganic materials make the inorganic adhesives face problems such as brittleness and low adhesive strength in practical use, which is difficult to meet high mechanical requirements such as thermal shock and high-low temperature cycling.

SUMMARY

In order to solve the problem that the thermally conductive adhesives in the prior art can not meet the requirements of high thermal conductivity, good bonding performance and insulation characteristics at the same time, the present disclosure provides a method for preparing an organic/inorganic hybrid high thermally conductive and insulating two-component adhesive and a method for using the same.

Provided is a method for preparing an organic/inorganic hybrid high thermally conductive and insulating two-component adhesive, including the following steps:

1) preparing an organic phase aluminum dihydrogen phosphate:

in parts by mass, weighing 100 parts of an aluminum dihydrogen phosphate aqueous solution, 50-100 parts of ethyl acetate and 0.1-1 part of chromium chloride; subjecting the 100 parts of the aluminum dihydrogen phosphate aqueous solution to reduced pressure distillation to obtain a distilled aluminum dihydrogen phosphate solution; adding the 50-100 parts of the ethyl acetate to the distilled aluminum dihydrogen phosphate solution and uniformly stirring; adding the 0.1-1 part of the chromium chloride to a resulting system and stirring until the chromium chloride is completely dissolved to obtain a mixture; and finally storing the mixture in a sealed manner to obtain the organic phase aluminum dihydrogen phosphate;

2) treating a diamond thermally conductive filler:

subjecting diamond particles to sintering and acid treatment in sequence to obtain acid-treated diamond particles; adding the acid-treated diamond particles to a solution of lithium aluminum hydride and sodium borohydride in tetrahydrofuran; subjecting a resulting system to a reflux reaction; and finally washing and air drying a resulting reaction product to obtain a treated diamond thermally conductive filler;

where in the solution of lithium aluminum hydride and sodium borohydride in tetrahydrofuran, a mass ratio of the lithium aluminum hydride to the sodium borohydride is in a range of 1:1 to 1:3, and a total mass percentage of the lithium aluminum hydride and the sodium borohydride is in a range of 5% to 10%;

3) modifying a polyurethane compatible with aluminum dihydrogen phosphate:

3.1) mixing spherical aluminum oxide particles with an isopropanol solution to obtain a mixture; adding a mixed solution of sodium tetrahydroaluminate and hydrogen peroxide to the mixture; subjecting a resulting mixed system to reaction; and finally cleaning and drying a resulting reaction product to obtain a pretreated aluminum oxide;

where in the mixed solution of sodium tetrahydroaluminate and hydrogen peroxide, a mass ratio of the sodium tetrahydroaluminate to the hydrogen peroxide is in a range of 1:1 to 1:3, and a total mass percentage of the sodium tetrahydroaluminate and the hydrogen peroxide is in a range of 10% to 20%; and 3.2) in parts by mass, weighing 100 parts of a polyurethane adhesive isocyanate A component and 2-5 parts of the pretreated aluminum oxide; and uniformly mixing the 2-5 parts of the pretreated aluminum oxide and the 100 parts of the polyurethane adhesive isocyanate A component under ultrasound to obtain the polyurethane compatible with aluminum dihydrogen phosphate;

4) preparing an organic/inorganic hybrid insulating two-component adhesive:

4.1) in parts by mass, weighing 100 parts of the organic phase aluminum dihydrogen phosphate and 50-400 parts of the polyurethane compatible with aluminum dihydrogen phosphate; adding the 50-400 parts of the polyurethane compatible with aluminum dihydrogen phosphate to the 100 parts of the organic phase aluminum dihydrogen phosphate, and uniformly mixing; and finally packaging a resulting mixture separately to obtain an organic/inorganic hybrid insulating adhesive A component; and 4.2) in parts by mass, weighing 100 parts of a polyurethane adhesive hydroxyl-terminated curing agent B component and 50-200 parts of the treated diamond thermally conductive filler; adding the 50-200 parts of the treated diamond thermally conductive filler to the 100 parts of the polyurethane adhesive hydroxyl-terminated curing agent B component, and uniformly mixing; and finally packaging a resulting mixture separately to obtain an organic/inorganic hybrid insulating adhesive B component; and forming the organic/inorganic hybrid high thermally conductive and insulating two-component adhesive from the organic/inorganic hybrid insulating adhesive A component and the organic/inorganic hybrid insulating adhesive B component.

Also provided is a method for using the organic/inorganic hybrid high thermally conductive and insulating two-component adhesive, including the following steps:

in parts by mass, weighing 100 parts of the organic/inorganic hybrid insulating adhesive A component and 50-100 parts of the organic/inorganic hybrid insulating adhesive B component; adding the 50-100 parts of the organic/inorganic hybrid insulating adhesive B component to the 100 parts of the organic/inorganic hybrid insulating adhesive A component; and uniformly mixing to obtain the organic/inorganic hybrid high thermally conductive and insulating two-component adhesive; coating the organic/inorganic hybrid high thermally conductive and insulating two-component adhesive onto a surface of a material to be bonded, and bonding to obtain a member to be bonded; subjecting the member to be bonded to defoaming by standing under conditions of vacuum pressure not less than $10^{-1}$ Pa and ambient temperature for 5-10 min to obtain a defoamed member to be bonded; and heating the defoamed member to be bonded to a temperature of 80-100° C. at a heating rate of 5-10° C./h, and holding at the temperature of 80-100° C. for 2-4 h. That is, the method for using the organic/inorganic hybrid high thermally conductive and insulating two-component adhesive is completed.

Some embodiments of the present disclosure have the following beneficial effects:

In the present disclosure, an organic phase aluminum dihydrogen phosphate thermally conductive adhesive body is obtained by processes such as distilling phosphoric acid, and the stability of the thermally conductive adhesive is improved by adding chromium chloride. A diamond as a thermally conductive filler is prepared into a hydroxylated diamond by an acid pickling activation process. The hydroxylated diamond is crosslinked with the aluminum dihydrogen phosphate to construct a thermally conductive network. At the same time, polyurethane is self-cured to construct an aluminum dihydrogen phosphate/polyurethane dual-network thermally conductive adhesive. That is, the diamond, as a thermally conductive filler, makes it possible to improve the thermal conductivity, and at the same time, to play a role of a crosslinking agent. In order to improve the bonding performance between the organic phase and the inorganic phase, nanometer aluminum oxide is added to the polyurethane to form an organic/inorganic hybrid network, which could improve the bonding strength of the organic phase and the inorganic phase and could greatly improve the bonding performance of the adhesive. In the system, aluminum dihydrogen phosphate and the diamond thermally conductive filler could ensure the construction of a three-dimensional thermally conductive network, and the combination of polyurethane could effectively solve the problems of high brittleness and low bonding strength of the inorganic system; thus, the organic/inorganic hybrid high thermally conductive and insulating two-component adhesive of the present disclosure could be regarded as an adhesive with high thermal conductivity, excellent insulation and strong bonding performance.

The present disclosure differs from the traditional blending mode of the thermally conductive filler, and the crosslinked inorganic thermally conductive network could ensure the high thermal conductivity of the insulating adhesive. The method provides use of the hybrid adhesive formed by the combination of a phosphate inorganic system and an organic system in thermal conductivity for the first time, and the prepared two-component adhesive has an excellent thermal conductivity and bonding strength, and a low thermal expansion coefficient, which has a wide application prospect in high thermal conductivity bonding, seal and potting of electronic devices and energy batteries.

The present disclosure is used for preparing and using the organic/inorganic hybrid high thermally conductive and insulating two-component adhesive.

DETAILED DESCRIPTION OF THE EMBODIMENTS

Figure 1:
FIG. 1 shows a physical picture of the aluminum dihydrogen phosphate aqueous solution and the organic phase aluminum dihydrogen phosphate prepared in Example 1 after standing for 7 days, where the left bottom represents the organic phase aluminum dihydrogen phosphate prepared in Example 1, and the right bottom represents the aluminum dihydrogen phosphate aqueous solution.

The technical solutions of the present disclosure are not limited to the embodiments listed below, but also include any combination of the embodiments.

Embodiment 1: A method for preparing an organic/inorganic hybrid high thermally conductive and insulating two-component adhesive, including the following steps:

1) preparing an organic phase aluminum dihydrogen phosphate:

in parts by mass, weighing 100 parts of an aluminum dihydrogen phosphate aqueous solution, 50-100 parts of ethyl acetate and 0.1-1 part of chromium chloride; subjecting the 100 parts of the aluminum dihydrogen phosphate aqueous solution to reduced pressure distillation to obtain a distilled aluminum dihydrogen phosphate solution; adding the 50-100 parts of the ethyl acetate to the distilled aluminum dihydrogen phosphate solution and uniformly stirring; adding the 0.1-1 part of the chromium chloride to a resulting system and stirring until the chromium chloride is completely dissolved to obtain a mixture; and finally storing the mixture in a sealed manner to obtain the organic phase aluminum dihydrogen phosphate;

2) treating a diamond thermally conductive filler:

subjecting diamond particles to sintering and acid treatment in sequence to obtain acid-treated diamond particles; adding the acid-treated diamond particles to a solution of lithium aluminum hydride and sodium borohydride in tetrahydrofuran; subjecting a resulting system to a reflux reaction; and finally washing and air drying a resulting reaction product to obtain a treated diamond thermally conductive filler;

where in the solution of lithium aluminum hydride and sodium borohydride in tetrahydrofuran, a mass ratio of the lithium aluminum hydride to the sodium borohydride is in a range of 1:1 to 1:3, and a total mass percentage of the lithium aluminum hydride and the sodium borohydride is in a range of 5% to 10%;

3) modifying a polyurethane compatible with aluminum dihydrogen phosphate:

3.1) mixing spherical aluminum oxide particles with an isopropanol solution to obtain a mixture; adding a mixed solution of sodium tetrahydroaluminate and hydrogen peroxide to the mixture; subjecting a resulting mixed system to reaction; and finally cleaning and drying a resulting reaction product to obtain a pretreated aluminum oxide;

where in the mixed solution of sodium tetrahydroaluminate and hydrogen peroxide, a mass ratio of the sodium tetrahydroaluminate to the hydrogen peroxide is in a range of 1:1 to 1:3, and a total mass percentage of the sodium tetrahydroaluminate and the hydrogen peroxide is in a range of 10% to 20%; and 3.2) in parts by mass, weighing 100 parts of a polyurethane adhesive isocyanate A component and 2-5 parts of the pretreated aluminum oxide; and uniformly mixing the 2-5 parts of the pretreated aluminum oxide and the 100 parts of the polyurethane adhesive isocyanate A component under ultrasound to obtain the polyurethane compatible with aluminum dihydrogen phosphate;

4) preparing an organic/inorganic hybrid insulating two-component adhesive:

4.1) in parts by mass, weighing 100 parts of the organic phase aluminum dihydrogen phosphate and 50-400 parts of the polyurethane compatible with aluminum dihydrogen phosphate; adding the 50-400 parts of the polyurethane compatible with aluminum dihydrogen phosphate to the 100 parts of the organic phase aluminum dihydrogen phosphate, and uniformly mixing; and finally packaging a resulting mixture separately to obtain an organic/inorganic hybrid insulating adhesive A component; and 4.2) in parts by mass, weighing 100 parts of a polyurethane adhesive hydroxyl-terminated curing agent B component and 50-200 parts of the treated diamond thermally conductive filler; adding the 50-200 parts of the treated diamond thermally conductive filler to the 100 parts of the polyurethane adhesive hydroxyl-terminated curing agent B component, and uniformly mixing; and finally packaging a resulting mixture separately to obtain an organic/inorganic hybrid insulating adhesive B component; and forming the organic/inorganic hybrid high thermally conductive and insulating two-component adhesive from the organic/inorganic hybrid insulating adhesive A component and the organic/inorganic hybrid insulating adhesive B component.

In step 1) of this embodiment, chromium chloride is added, in order to improve the stability of the solution and reduce the viscosity of the phosphate.

In step 2) of this embodiment, the surface of the diamond is hydroxylated by an activating grafting process, in order to make the diamond cross-link with the phosphate resin, improve the interfacial compatibility between the diamond and the phosphate resin, and make it possible to cure and reduce interfacial thermal resistance.

The above embodiment has the following beneficial effects:

In the embodiment, an organic phase aluminum dihydrogen phosphate thermally conductive adhesive body is obtained by processes such as distilling phosphoric acid, and the stability of the thermally conductive adhesive is improved by adding chromium chloride. A diamond as a thermally conductive filler is prepared into a hydroxylated diamond by an acid pickling activation process. The hydroxylated diamond is crosslinked with the aluminum dihydrogen phosphate to construct a thermally conductive network. At the same time, polyurethane is self-cured to construct an aluminum dihydrogen phosphate/polyurethane dual-network thermally conductive adhesive. That is, the diamond, as a thermally conductive filler, makes it possible to improve the thermal conductivity, and at the same time, to play a role of a crosslinking agent. In order to improve the bonding performance between the two, nanometer aluminum oxide is added to the polyurethane to form an organic/inorganic hybrid network, which could improve the bonding strength of the organic phase and the inorganic phase and could greatly improve the bonding performance of the adhesive. In the system, aluminum dihydrogen phosphate and the diamond thermally conductive filler could ensure the construction of a three-dimensional thermally conductive network, and the combination of polyurethane could effectively solve the problems of high brittleness and low bonding strength of the inorganic system; thus, the organic/inorganic hybrid high thermally conductive and insulating two-component adhesive of the embodiment could be regarded as an adhesive with high thermal conductivity, excellent insulation and strong bonding performance.

The embodiment differs from the traditional blending mode of the thermally conductive filler, and the crosslinked inorganic thermally conductive network could ensure the high thermal conductivity of the insulating adhesive. The method provides use of the hybrid adhesive formed by the combination of a phosphate inorganic system and an organic system in thermal conductivity for the first time, and the prepared two-component adhesive has an excellent thermal conductivity and bonding strength, and a low thermal expansion coefficient, which has a wide application prospect in high thermal conductivity bonding, seal and potting of electronic devices and energy batteries.

Embodiment 2: the embodiment 2 is performed according to the embodiment 1, except that in step 1), a mass percentage of the aluminum dihydrogen phosphate aqueous solution is in a range of 40% to 60%; and in step 1), subjecting the aluminum dihydrogen phosphate aqueous solution to the reduced pressure distillation is performed at a pressure of 0.1-1 Pa, a rotating speed of 60-80 r/min and a temperature of 75-80° C. in a rotary evaporator, until no water is evaporated out.

Embodiment 3: the embodiment 3 is performed according to the embodiment 1 or 2, except that in step 2), the diamond particles have an average particle size of 5-20 m; and in step 3.1), the spherical aluminum oxide particles have an average particle size of 30-50 nm.

Embodiment 4: the embodiment 4 is performed according to any one of the embodiments 1-3, except that in step 2), subjecting diamond particles to sintering and acid treatment in sequence is performed as follows: subjecting the diamond particles to the sintering at a temperature of 350-400° C. in an air atmosphere for 20-30 min to obtain sintered diamond particles; adding the sintered diamond particles into a mixed acid, and subjecting a resulting system to reaction at a temperature of 100-120° C. for 12-16 h; washing a resulting reaction product with a 5%-10% of lithium hydroxide solution and anhydrous ethanol respectively under ultrasound at a power of 400-600 w for 1-2 h; and finally drying a resulting washed product to obtain the acid-treated diamond particles.

Embodiment 5: the embodiment 5 is performed according to any one of the embodiments 1-4, except that the mixed acid is a mixture of sulfuric acid, chromic acid and nitric acid, and a volume ratio of the sulfuric acid to the chromic acid is in a range of 1:0.5 to 1:1 and a volume ratio of the sulfuric acid to the nitric acid is in a range of 1:1 to 1:2; and a mass percentage of the sulfuric acid is in a range of 80%-98.4%, a mass percentage of the chromic acid is in a range of 50%-65%, and a mass percentage of the nitric acid is in a range of 50%-65%.

Embodiment 6: the embodiment 6 is performed according to any one of the embodiments 1-5, except that in step 2), the reflux reaction is performed at a temperature of 40-50° C. for 2-4 h.

Embodiment 7: the embodiment 7 is performed according to any one of the embodiments 1-6, except that in step 3.1), a ratio of a mass of the spherical aluminum oxide particles to a volume of the isopropanol solution is in a range of 1 g: 50 mL to 1 g: 100 mL; in step 3.1), a ratio of the mass of the spherical aluminum oxide particles to a volume of the mixed solution of sodium tetrahydroaluminate and hydrogen peroxide is in a range of 1 g: 5 mL to 1 g: 10 mL; and in step 3.1), the reaction is performed at a temperature of 60-80° C. under stirring for 1-2 h.

Embodiment 8: a method for using the organic/inorganic hybrid high thermally conductive and insulating two-component adhesive of the embodiment 8 is performed according to the following steps:

in parts by mass, weighing 100 parts of the organic/inorganic hybrid insulating adhesive A component and 50-100 parts of the organic/inorganic hybrid insulating adhesive B component; adding the 50-100 parts of the organic/inorganic hybrid insulating adhesive B component to the 100 parts of the organic/inorganic hybrid insulating adhesive A component, and uniformly mixing to obtain the organic/inorganic hybrid high thermally conductive and insulating two-component adhesive; coating the organic/inorganic hybrid high thermally conductive and insulating two-component adhesive onto a surface of a material to be bonded, and bonding to obtain a member to be bonded; subjecting the member to be bonded to defoaming by standing under conditions of vacuum pressure not less than $10^{-1}$ Pa and ambient temperature for 5-10 min to obtain a defoamed member to be bonded; and heating the defoamed member to be bonded to a temperature of 80-100° C. at a heating rate of 5-10° C./h, and holding at the temperature of 80-100° C. for 2-4 h. That is, the method for using the organic/inorganic hybrid high thermally conductive and insulating two-component adhesive is completed.

Embodiment 9: the embodiment 9 is performed according to the embodiment 8, except that the mixing is performed at a rotation speed of 30-50 r/min for 5-10 min; and after the organic/inorganic hybrid high thermally conductive and insulating two-component adhesive is coated onto the surface to be bonded, a resulting coating has a thickness of 100-200 m.

Embodiment 10: the embodiment 10 is performed according to the embodiment 8 or 9, except that the material to be bonded is selected from the group consisting of a wood board, an epoxy resin, a stainless steel, an aluminum alloy and a titanium alloy.

The following examples are used to verify the beneficial effects of the present disclosure:

Example 1

A method for preparing an organic/inorganic hybrid high thermally conductive and insulating two-component adhesive was performed by the following steps:

1. Preparation of an Organic Phase Aluminum Dihydrogen Phosphate:

In parts by mass, 100 parts of an aluminum dihydrogen phosphate aqueous solution, 100 parts of ethyl acetate and 1 part of chromium chloride were weighed. The 100 parts of the aluminum dihydrogen phosphate aqueous solution was subjected to reduced pressure distillation to obtain a distilled aluminum dihydrogen phosphate solution. 100 parts of the ethyl acetate was added to the distilled aluminum dihydrogen phosphate aqueous solution, and stirred to be uniform. Then 1 part of the chromium chloride was added thereto and stirred until the chromium chloride was dissolved completely to obtain a mixture. Finally, the mixture was stored in a sealed manner to obtain the organic phase aluminum dihydrogen phosphate.

2. Treatment of a Diamond Thermally Conductive Filler:

Diamond particles were subjected to sintering and acid treatment in sequence to obtain acid-treated diamond particles. The acid-treated diamond particles were added to a solution of lithium aluminum hydride and sodium borohydride in tetrahydrofuran, and a resulting system was subjected to a reflux reaction. Finally, a resulting reaction product was washed with absolute ethanol and air-dried to obtain the treated diamond thermally conductive filler.

Where in the solution of lithium aluminum hydride and sodium borohydride in tetrahydrofuran, a mass ratio of the lithium aluminum hydride to the sodium borohydride was 1:3, and a total mass percentage of the lithium aluminum hydride and the sodium borohydride was 10%.

3. Modification of a Polyurethane Compatible with Aluminum Dihydrogen Phosphate:

3.1) Spherical aluminum oxide particles were mixed with an isopropanol solution to obtain a mixture, then a mixed solution of sodium tetrahydroaluminate and hydrogen peroxide was added to the mixture and subjected to reaction, and finally a resulting reaction product was cleaned and dried to obtain a pretreated aluminum oxide.

Where a mass ratio of the sodium tetrahydroaluminate to the hydrogen peroxide in the mixed solution of sodium tetrahydroaluminate and hydrogen peroxide was 1:3; and a total mass percentage of the sodium tetrahydroaluminate and the hydrogen peroxide in the mixed solution of sodium tetrahydroaluminate and hydrogen peroxide was 10%.

3.2) In parts by mass, 100 parts of a polyurethane adhesive isocyanate A component and 5 parts of the pretreated aluminum oxide were weighed. The 5 parts of the pretreated aluminum oxide and the 100 parts of the polyurethane adhesive isocyanate A component were mixed to be uniform under ultrasound to obtain the polyurethane compatible with aluminum dihydrogen phosphate.

4. Preparation of an Organic/Inorganic Hybrid Insulating Two-Component Adhesive:

4.1) in parts by mass, 100 parts of the organic phase aluminum dihydrogen phosphate and 50 parts of the polyurethane compatible with aluminum dihydrogen phosphate were weighed. The 50 parts of the polyurethane compatible with aluminum dihydrogen phosphate was added to the 100 parts of the organic phase aluminum dihydrogen phosphate, and stirred at 30° C. for 4 h to obtain a mixture. Finally, the mixture was packaged separately to obtain an organic/inorganic hybrid insulating adhesive A component;

4.2) in parts by mass, 100 parts of a polyurethane adhesive hydroxyl-terminated curing agent B component and 50 parts of the treated diamond thermally conductive filler were weighed. The 50 parts of the treated diamond thermally conductive filler was added to the 100 parts of the polyurethane adhesive hydroxyl-terminated curing agent B component, and stirred at 25° C. for 0.5 h to obtain a mixture. Finally, the mixture was packaged separately to obtain an organic/inorganic hybrid insulating adhesive B component.

The organic/inorganic hybrid insulating adhesive A component and the organic/inorganic hybrid insulating adhesive B component formed the organic/inorganic hybrid high thermally conductive and insulating two-component adhesive.

In step 1, a mass percentage of the aluminum dihydrogen phosphate aqueous solution was 40%.

In step 1, the reduced pressure distillation was performed as follows: the aluminum dihydrogen phosphate aqueous solution was subjected to reduced pressure distillation at a pressure of 1 Pa, a rotating speed of 80 r/min and a temperature of 80° C. in a rotary evaporator, until no water was evaporated out.

In step 2, the diamond particles have an average particle size of 5-20 μm. In step 3.1), the spherical aluminum oxide particles have an average particle size of 30-50 nm.

In step 2, the diamond particles were subjected to sintering and acid treatment in sequence, which was performed as follows: the diamond particles were subjected to sintering at 400° C. in an air atmosphere for 20 min to obtain sintered diamond particles, the sintered diamond particles were added in a mixed acid, and a resulting system was subjected to reaction at 120° C. for 12 h. Then a resulting reaction product was washed with a 5% lithium hydroxide solution and anhydrous ethanol under ultrasound at a power of 400 w for 1 h. Finally a resulting washed product was washed to obtain acid-treated diamond particles. Where the mixed acid was a mixture of sulfuric acid, chromic acid and nitric acid, and a volume ratio of the sulfuric acid to the chromic acid was 1:1 and a volume ratio of the sulfuric acid to the nitric acid was 1:1; and a mass percentage of the sulfuric acid was 98.4%, a mass percentage of the chromic acid was 65%, and a mass percentage of the nitric acid was 65%.

In step 2, the reflux reaction was performed at 50° C. for 4 h.

In step 3.1), a ratio of a mass of the spherical aluminum oxide particles to a volume of the isopropanol solution was 1 g: 50 mL; in step 3.1), a ratio of the mass of the spherical aluminum oxide particles to a volume of the mixed solution of sodium tetrahydroaluminate and hydrogen peroxide was 1 g: 5 mL; and in step 3.1), the reaction was performed at 60° C. under stirring for 2 h.

In step 3.2), the polyurethane adhesive isocyanate A component was commercially purchased from the American 3M brand EC-3532 polyurethane adhesive A component. In step 4.2), the polyurethane adhesive hydroxyl-terminated curing agent B component was commercially purchased from the American 3M brand EC-3532 polyurethane adhesive B component.

A method for using the prepared organic/inorganic hybrid high thermally conductive and insulating two-component adhesive was performed as follows:

In parts by mass, 100 parts of the organic/inorganic hybrid insulating adhesive A component and 50 parts of the organic/inorganic hybrid insulating adhesive B component were weighed. The 50 parts of the organic/inorganic hybrid insulating adhesive B component was added to the 100 parts of the organic/inorganic hybrid insulating adhesive A component, and mixed to be uniform to obtain the organic/inorganic hybrid high thermally conductive and insulating two-component adhesive. The organic/inorganic hybrid high thermally conductive and insulating two-component adhesive was coated onto a surface of a material to be bonded, and bonded to obtain a member to be bonded. The member to be bonded was stood under conditions of vacuum pressure not less than $10^{-1}$ Pa and ambient temperature for 10 min to obtain a defoamed member to be bonded. The defoamed member to be bonded was heated to 100° C. at a heating rate of 5° C./h, and held at 100° C. for 2 h. That is, the method for using the organic/inorganic hybrid high thermally conductive and insulating two-component adhesive was completed.

The mixing was performed at a rotating speed of 30 r/min for 5 min. After the organic/inorganic hybrid high thermally conductive and insulating two-component adhesive was coated onto the surface to be bonded, a resulting coating had a thickness of 100 μm.

Example 2: Example 2 was performed according to the example 1, except that in step 4.1), 100 parts of the organic phase aluminum dihydrogen phosphate and 100 parts of polyurethane compatible with aluminum dihydrogen phosphate were weighed.

Example 3: Example 3 was performed according to the example 1, except that in step 4.1), 100 parts of the organic phase aluminum dihydrogen phosphate and 200 parts of polyurethane compatible with aluminum dihydrogen phosphate were weighed.

Example 4: Example 4 was performed according to the example 1, except that in step 4.1), 100 parts of the organic phase aluminum dihydrogen phosphate and 300 parts of polyurethane compatible with aluminum dihydrogen phosphate were weighed.

Example 5: Example 5 was performed according to the example 1, except that in step 4.1), 100 parts of the organic phase aluminum dihydrogen phosphate and 400 parts of polyurethane compatible with aluminum dihydrogen phosphate were weighed.

Comparative Example: the Comparative Example was performed according to the example 1, except that step 3 was cancelled, and in step 4.1), 100 parts of the organic phase aluminum dihydrogen phosphate and 50 parts of the polyurethane adhesive isocyanate A component were weighed, and the 50 parts of the polyurethane adhesive isocyanate A component was added to the 100 parts of the organic phase aluminum dihydrogen phosphate, and stirred at 30° C. for 4 h. Finally, a resulting product was packaged separately to obtain the organic/inorganic hybrid insulating adhesive A.

FIG. 1 shows a physical picture of the aluminum dihydrogen phosphate aqueous solution and the organic phase aluminum dihydrogen phosphate prepared in Example 1 after standing for 7 days, where the left bottom represents the organic phase aluminum dihydrogen phosphate prepared in Example 1 and the right bottom represents the aluminum dihydrogen phosphate aqueous solution. From FIG. 1, it can be seen that the organic phase aluminum dihydrogen phosphate is consistent with the aluminum dihydrogen phosphate aqueous solution, and there is no precipitation, sedimentation, delamination and other phenomena, showing good stability.

Figure 2:
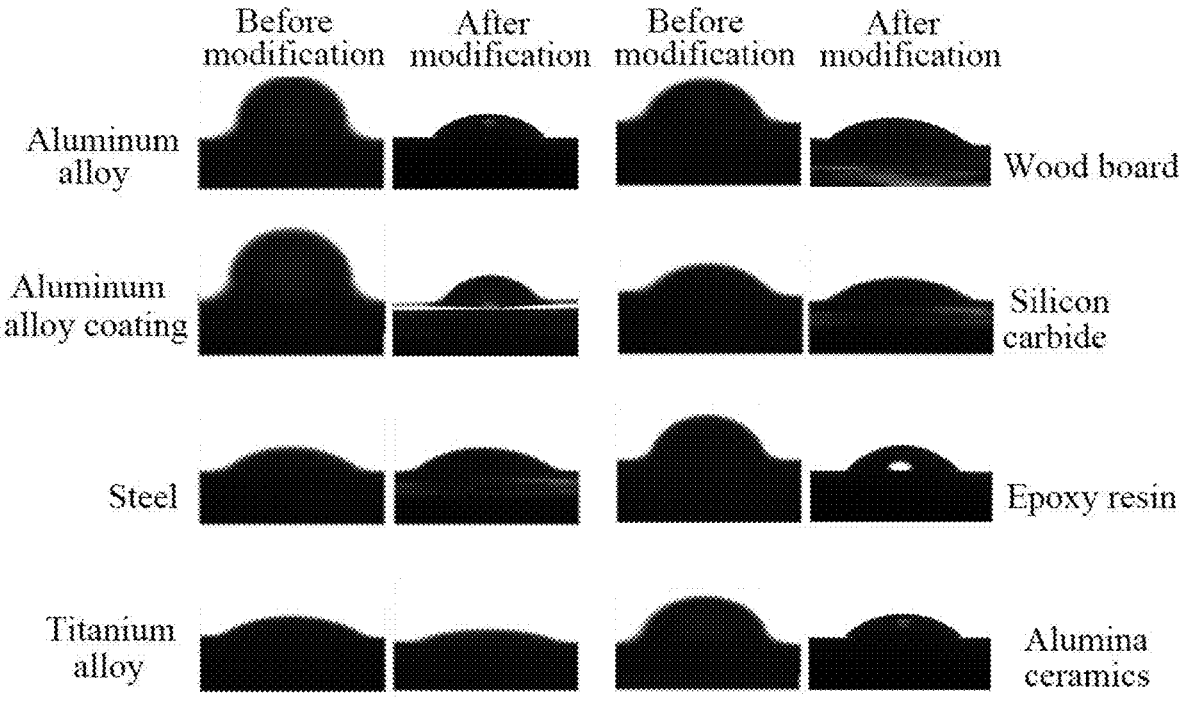
FIG. 2 is a graph showing the wetting of different substrates by the aluminum dihydrogen phosphate aqueous solution and the organic phase aluminum dihydrogen phosphate prepared in Example 1, where "After modification" represents the organic phase aluminum dihydrogen phosphate prepared in Example 1 and "Before modification" represents the aluminum dihydrogen phosphate aqueous solution.

FIG. 2 is a graph showing the wetting of different substrates by the aluminum dihydrogen phosphate aqueous solution and the organic phase aluminum dihydrogen phosphate prepared in Example 1, where "After modification" represents the organic phase aluminum dihydrogen phosphate prepared in Example 1 and "Before modification" represents the aluminum dihydrogen phosphate aqueous solution. In FIG. 2, the titanium alloy is a TC4 titanium alloy, the steel is a 316L stainless steel, the epoxy resin is an E51 bisphenol A epoxy resin, the aluminum alloy is a 6061 aluminum alloy, and the wood board is a hemlock wood board. From FIG. 2, it can be seen that the wetting performance of the modified organic phase aluminum dihydrogen phosphate has been significantly optimized.

Figure 3:
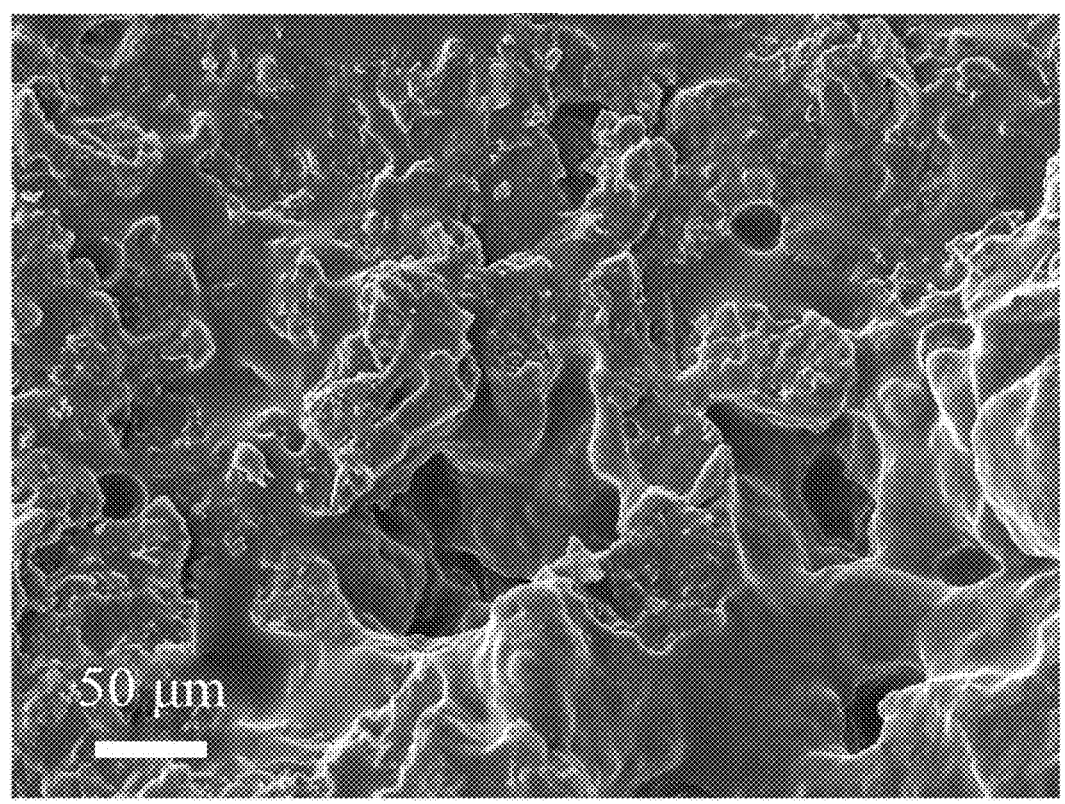
FIG. 3 shows a micromorphology graph of the organic/inorganic hybrid high thermally conductive and insulating two-component adhesive prepared in Example 1 after curing.

FIG. 3 shows a micromorphology graph of the organic/inorganic hybrid high thermally conductive and insulating two-component adhesive prepared in Example 1 after curing. Curing conditions: the organic/inorganic hybrid insulating adhesive A component and the organic/inorganic hybrid insulating adhesive B component prepared in Example 1 are mixed according to a mass ratio of 1:1, and a resulting mixture is defoamed by standing at ambient temperature under a vacuum pressure of $10^{-1}$ Pa for 10 min to obtain a defoamed member to be bonded, and then the defoamed member to be bonded is heated to 100° C. at a heating rate of 5° C./h, and kept at 100° C. for 2 h. From FIG. 3, it can be seen that, after curing, the colloid is dense and there are no pores.

Figure 4:
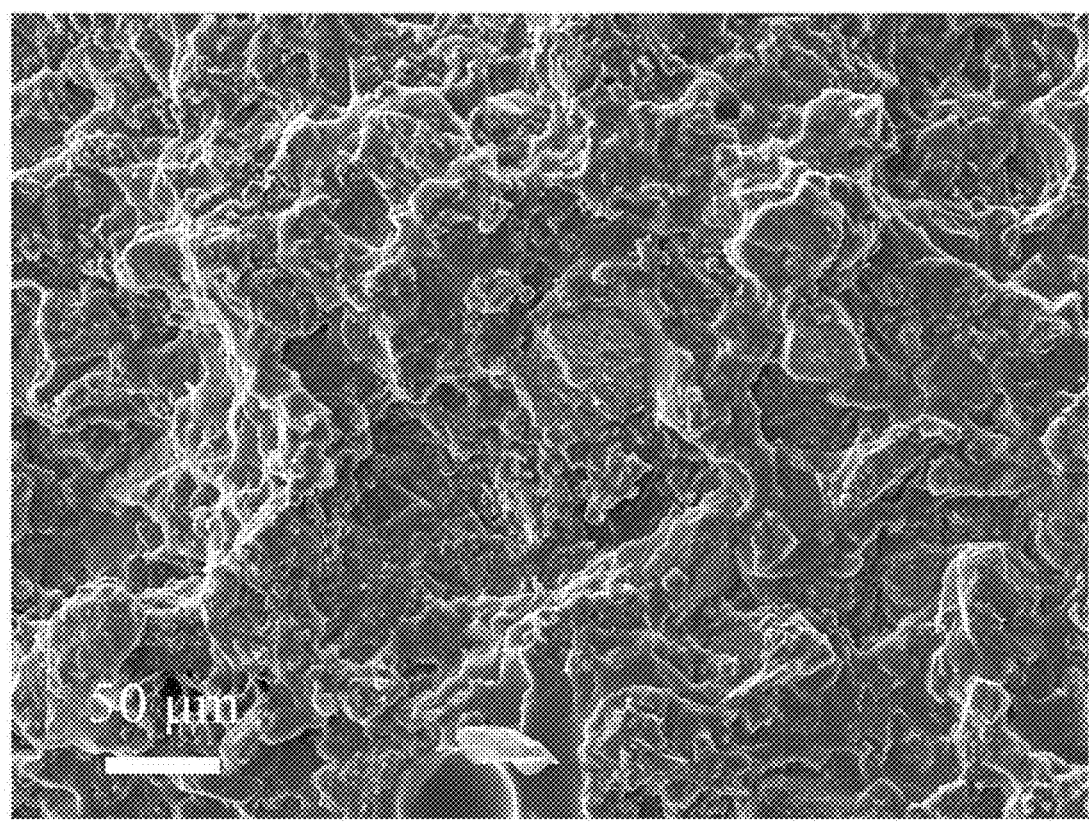
FIG. 4 shows a micromorphology graph of the organic/inorganic hybrid high thermally conductive and insulating two-component adhesive prepared by the Comparative Example after curing.

FIG. 4 shows a micromorphology graph of the organic/inorganic hybrid high thermally conductive and insulating two-component adhesive prepared by the Comparative Example after curing. Curing conditions: the organic/inorganic hybrid insulating adhesive A component and the organic/inorganic hybrid insulating adhesive B component prepared in Comparative Example 1 are mixed according to a mass ratio of 1:1, and a resulting mixture is defoamed by standing at ambient temperature under a vacuum pressure of 101 Pa for 10 min to obtain a defoamed member to be bonded, and then the defoamed member to be bonded is heated to 100° C. at a heating rate of 5° C./h, and kept at 100° C. for 2 h. From FIG. 4, it can be seen that, after curing, there are pores in the colloid, and the phase separation of the organic/inorganic system is serious.

Figure 5:
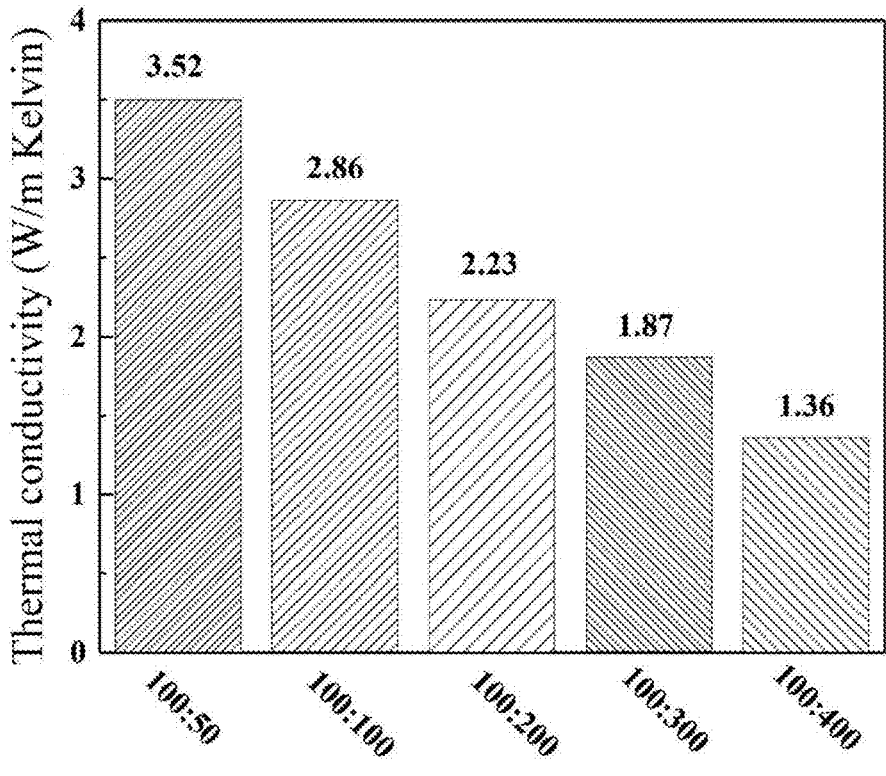
FIG. 5 shows a comparison diagram of the thermal conductivity of the adhesives containing different parts of polyurethane compatible with aluminum dihydrogen phosphate in Examples 1 to 5.

FIG. 5 shows a comparison diagram of the thermal conductivity of the adhesives containing different parts of the polyurethane compatible with aluminum dihydrogen phosphate in Examples 1 to 5. Where the abscissa represents a mass ratio of the organic phase aluminum dihydrogen phosphate to the polyurethane compatible with aluminum dihydrogen phosphate, which includes 100:50, 100:100, 100:200, 100:300 and 100:400, respectively. From FIG. 5, it can be seen that the thermal conductivity of the organic/inorganic hybrid high thermally conductive and insulating two-component adhesive decreases with the increase of the polyurethane compatible with aluminum dihydrogen phosphate when the amount of the diamond thermally conductive filler is constant. When the mass ratio of the organic phase aluminum dihydrogen phosphate to the polyurethane compatible with aluminum dihydrogen phosphate is 100:50, the maximum thermal conductivity is 3.52 W/m Kelvin; when the mass ratio of the organic phase aluminum dihydrogen phosphate to the polyurethane compatible with aluminum dihydrogen phosphate is 100:400, the minimum thermal conductivity is 1.36 W/m Kelvin.

Figure 6:
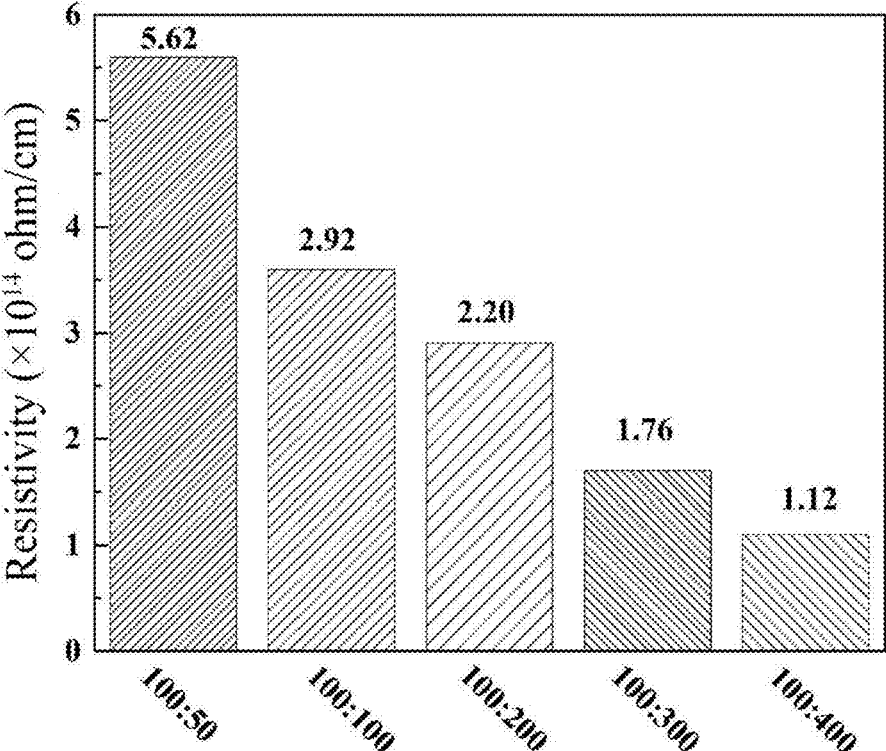
FIG. 6 shows a comparison diagram of the insulation characteristics of the adhesives containing different parts of the polyurethane compatible with aluminum dihydrogen phosphate in Examples 1 to 5.

FIG. 6 shows a comparison diagram of the insulation characteristics of the adhesives containing different parts of the polyurethane compatible with aluminum dihydrogen phosphate in Examples 1 to 5. Where the abscissa represents a mass ratios of the organic phase aluminum dihydrogen phosphate to the polyurethane compatible with aluminum dihydrogen phosphate, which includes 100:50, 100:100, 100:200, 100:300 and 100:400, respectively. From FIG. 6, it can be seen that the resistivity of the organic/inorganic hybrid high thermally conductive and insulating two-component adhesive decreases with the increase of the polyurethane compatible with aluminum dihydrogen phosphate but still maintains a high insulating state when the amount of the diamond thermally conductive filler is constant. When the mass ratio of the organic phase aluminum dihydrogen phosphate to the polyurethane compatible with aluminum dihydrogen phosphate is 100:50, the maximum resistivity is $5.62 \times 10^{14}$ ohm/cm; when the mass ratio of the organic phase aluminum dihydrogen phosphate to the polyurethane compatible with aluminum dihydrogen phosphate is 100:400, the minimum resistivity is $1.12 \times 10^{14}$ ohm/cm.

Figure 7:
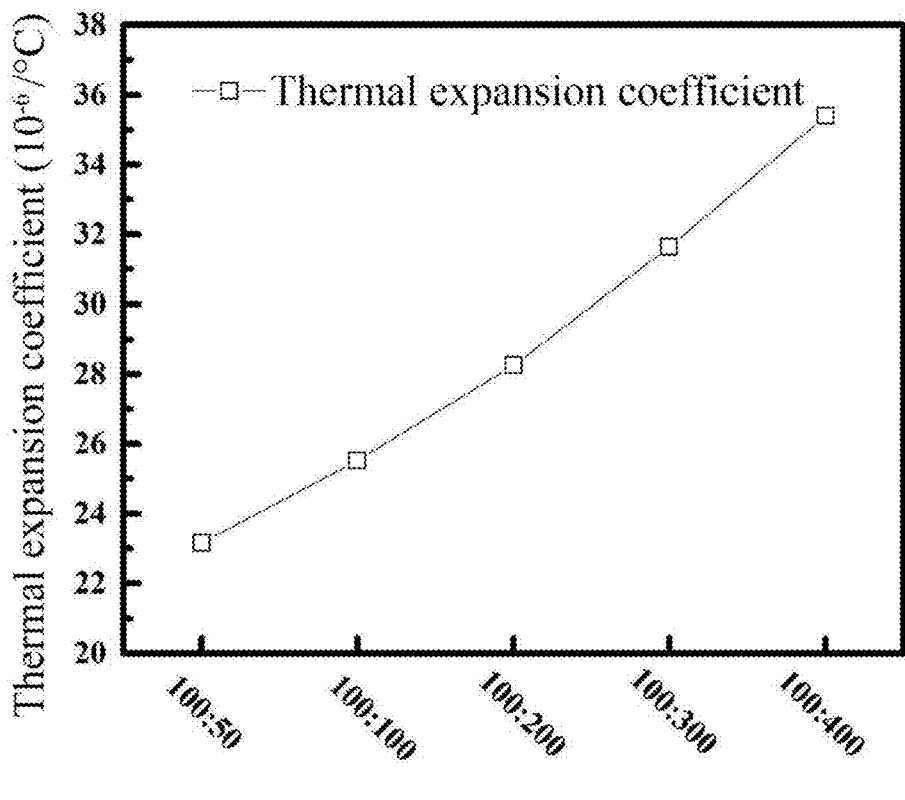
FIG. 7 shows a comparison diagram of the thermal expansion coefficients of the adhesives containing different parts of the polyurethane compatible with aluminum dihydrogen phosphate in Examples 1 to 5.

FIG. 7 shows a comparison diagram of the thermal expansion coefficients of the adhesives containing different parts of the polyurethane compatible with aluminum dihydrogen phosphate in Examples 1 to 5. Where the abscissa represents a mass ratios of the organic phase aluminum dihydrogen phosphate to the polyurethane compatible with aluminum dihydrogen phosphate, which includes 100:50, 100:100, 100:200, 100:300 and 100:400, respectively. From FIG. 7, it can be seen that the organic/inorganic hybrid high thermally conductive and insulating two-component adhesive has a low thermal expansion coefficient when the content of polyurethane compatible with aluminum dihydrogen phosphate is low. When the mass ratio of the organic phase aluminum dihydrogen phosphate to the polyurethane compatible with aluminum dihydrogen phosphate is 100:50, the minimum thermal expansion coefficient is $23.16 \times 10^{-6}/°$ C.; when the mass ratio of the organic phase aluminum dihydrogen phosphate to the polyurethane compatible with aluminum dihydrogen phosphate is 100:400, the maximum thermal expansion coefficient is $35.39 \times 10^{-6}/°$ C.

Figure 8:
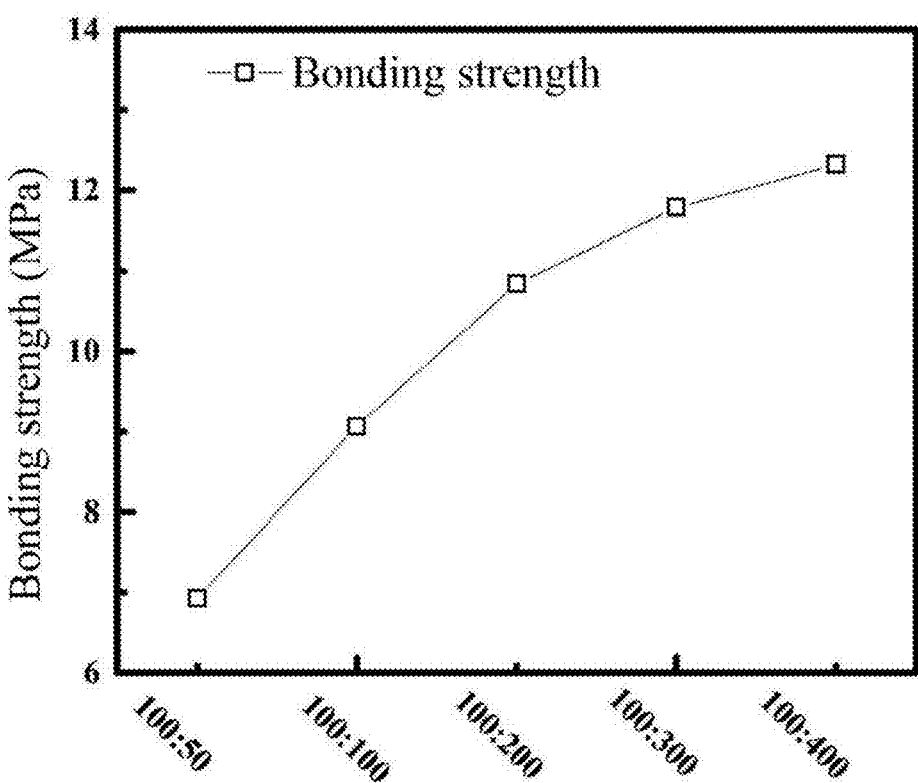
FIG. 8 shows a comparison diagram of the bonding strength of the adhesives containing different parts of the polyurethane compatible with aluminum dihydrogen phosphate in Examples 1 to 5 to the 316L stainless steel.

FIG. 8 shows a comparison diagram of the bonding strength of the adhesives containing different parts of the polyurethane compatible with aluminum dihydrogen phosphate in Examples 1 to 5 to the 316L stainless steel. Where the adhesive strength was tested according to GB-T7124-2008, and the abscissa represents a mass ratios of the organic phase aluminum dihydrogen phosphate to the polyurethane compatible with aluminum dihydrogen phosphate, which includes 100:50, 100:100, 100:200, 100:300 and 100:400, respectively. From FIG. 8, it can be seen that the bonding strength of the organic/inorganic hybrid high thermally conductive and insulating two-component adhesive significantly enhances with the increase of the polyurethane compatible with aluminum dihydrogen phosphate when the amount of the diamond thermally conductive filler is constant. When the mass ratio of the organic phase aluminum dihydrogen phosphate to the polyurethane compatible with aluminum dihydrogen phosphate is 100:50, the minimum bonding strength is 6.93 MPa; when the mass ratio of the organic phase aluminum dihydrogen phosphate to the polyurethane compatible with aluminum dihydrogen phosphate is 100:400, the maximum bonding strength is 12.32 MPa.

Figure 9A:
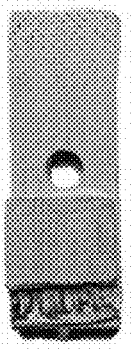
FIG. 9A shows a damaged morphology graph of a hemlock wood board after bonding with the organic/inorganic hybrid high thermally conductive and insulating two-component adhesive prepared in Example 1.
Figure 9A:
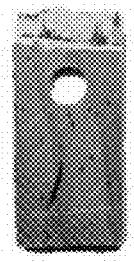
Figure 9B:
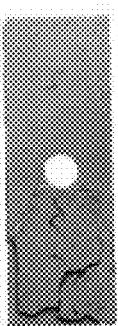
FIG. 9B shows a damaged morphology graph of an E51 bisphenol A epoxy resin after bonding with the organic/inorganic hybrid high thermally conductive and insulating two-component adhesive prepared in Example 1.
Figure 9B:
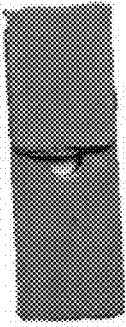
Figure 9C:
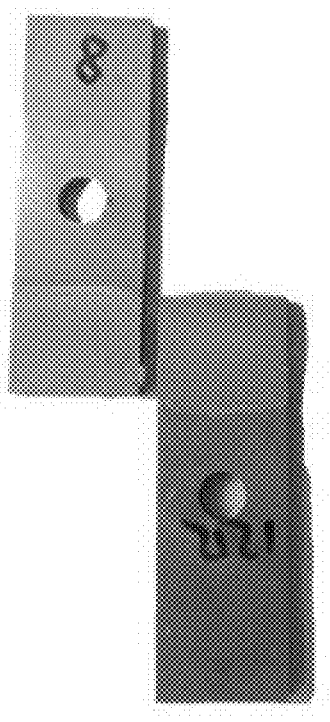
FIG. 9C shows a damaged morphology graph of a 316L stainless steel after bonding with the organic/inorganic hybrid high thermally conductive and insulating two-component adhesive prepared in Example 1.
Figure 9D:
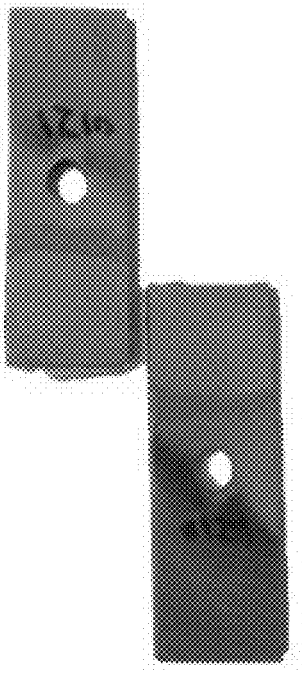
FIG. 9D shows a damaged morphology graph of a 6061 aluminum alloy after bonding with the organic/inorganic hybrid high thermally conductive and insulating two-component adhesive prepared in Example 1.

FIG. 9A shows a damaged morphology graph of a hemlock wood board after bonding with the organic/inorganic hybrid high thermally conductive and insulating two-component adhesive prepared in Example 1. FIG. 9B shows a damaged morphology graph of an E51 bisphenol A epoxy resin after bonding with the organic/inorganic hybrid high thermally conductive and insulating two-component adhesive prepared in Example 1. FIG. 9C shows a damaged morphology graph of a 316L stainless steel after bonding with the organic/inorganic hybrid high thermally conductive and insulating two-component adhesive prepared in Example 1. FIG. 9D shows a damaged morphology graph of a 6061 aluminum alloy after bonding with the organic/inorganic hybrid high thermally conductive and insulating two-component adhesive prepared in Example 1. The materials were tested according to GB-T7124-2008. From FIG. 9A to FIG. 9D, it can be seen that the tensile damage of the samples all occurs at the adhesive, and there is no debonding phenomenon between the adhesive and the test samples, showing that the adhesive has good bonding performance.

What is claimed is:

1. A method for preparing an organic/inorganic hybrid thermally conductive and insulating two-component adhesive, comprising the following steps:

1) Preparing an organic phase aluminum dihydrogen phosphate:

in parts by mass, weighing 100 parts of an aluminum dihydrogen phosphate aqueous solution, 50-100 parts of ethyl acetate and 0.1-1 part of chromium chloride; subjecting the 100 parts of the aluminum dihydrogen phosphate aqueous solution to reduced pressure distillation to obtain a distilled aluminum dihydrogen phosphate solution; adding the 50-100 parts of the ethyl acetate to the distilled aluminum dihydrogen phosphate solution and stirring; adding the 0.1-1 part of the chromium chloride to a resulting system and stirring until the chromium chloride is dissolved to obtain a first mixture; and finally storing the first mixture in a sealed manner to obtain the organic phase aluminum dihydrogen phosphate;

2) Treating a diamond thermally conductive filler:

subjecting diamond particles to sintering and acid treatment in sequence to obtain acid-treated diamond particles; adding the acid-treated diamond particles to a solution of lithium aluminum hydride and sodium borohydride in tetrahydrofuran; subjecting a resulting system to a reflux reaction; and finally washing and air drying a resulting reaction product to obtain a treated diamond thermally conductive filler;

wherein in the solution of lithium aluminum hydride and sodium borohydride in tetrahydrofuran, a mass ratio of the lithium aluminum hydride to the sodium borohydride is in a range of 1:1 to 1:3, and a total mass percentage of the lithium aluminum hydride and the sodium borohydride is in a range of 5% to 10%;

3) Modifying a polyurethane compatible with aluminum dihydrogen phosphate:

3.1) mixing spherical aluminum oxide particles with an isopropanol solution to obtain a second mixture; adding a mixed solution of sodium tetrahydroaluminate and hydrogen peroxide to the second mixture; subjecting a resulting mixed system to reaction; and finally cleaning and drying a resulting reaction product to obtain a pretreated aluminum oxide;

wherein in the mixed solution of sodium tetrahydroaluminate and hydrogen peroxide, a mass ratio of the sodium tetrahydroaluminate to the hydrogen peroxide is in a range of 1:1 to 1:3, and a total mass percentage of the sodium tetrahydroaluminate and the hydrogen peroxide is in a range of 10% to 20%; and 3.2) in parts by mass, weighing 100 parts of a polyurethane adhesive isocyanate A component and 2-5 parts of the pretreated aluminum oxide; and mixing the 2-5 parts of the pretreated aluminum oxide and the 100 parts of the polyurethane adhesive isocyanate A component under ultrasound to obtain the polyurethane compatible with aluminum dihydrogen phosphate;

4) Preparing an organic/inorganic hybrid insulating two-component adhesive:

4.1) in parts by mass, weighing 100 parts of the organic phase aluminum dihydrogen phosphate and 50-400 parts of the polyurethane compatible with aluminum dihydrogen phosphate; adding the 50-400 parts of the polyurethane compatible with aluminum dihydrogen phosphate to the 100 parts of the organic phase aluminum dihydrogen phosphate, and mixing; and finally packaging a resulting mixture separately to obtain an organic/inorganic hybrid insulating adhesive A component; and 4.2) in parts by mass, weighing 100 parts of a polyurethane adhesive hydroxyl-terminated curing agent B component and 50-200 parts of the treated diamond thermally conductive filler; adding the 50-200 parts of the treated diamond thermally conductive filler to the 100 parts of the polyurethane adhesive hydroxyl-terminated curing agent B component, and mixing to obtain a third mixture; and finally packaging the third mixture separately to obtain an organic/inorganic hybrid insulating adhesive B component; and forming the organic/inorganic hybrid thermally conductive and insulating two-component adhesive from the organic/inorganic hybrid insulating adhesive A component and the organic/inorganic hybrid insulating adhesive B component.

2. The method of claim 1, wherein in step 1), a mass percentage of the aluminum dihydrogen phosphate aqueous solution is in a range of 40% to 60%; and in step 1), subjecting the aluminum dihydrogen phosphate aqueous solution to the reduced pressure distillation is performed at a pressure of 0.1 Pa to 1 Pa, a rotating speed of 60 r/min to 80 r/min and a temperature of 75° C. to 80° C. in a rotary evaporator, until no water is evaporated out.

3. The method of claim 1, wherein the diamond particles have an average particle size of 5 μm to 20 μm; and in step 3.1), the spherical aluminum oxide particles have an average particle size of 30 nm to 50 nm.

4. The method of claim 1, wherein in step 2), subjecting diamond particles to sintering and acid treatment in sequence is performed as follows: subjecting the diamond particles to the sintering at a temperature of 350° C. to 400° C. in an air atmosphere for 20 min to 30 min to obtain sintered diamond particles; adding the sintered diamond particles into a mixed acid, and subjecting a resulting system to reaction at a temperature of 100° C. to 120° C. for 12 h to 16 h; washing a resulting reaction product with a 5% to 10% of lithium hydroxide solution and anhydrous ethanol under ultrasound at a power of 400 w to 600 w for 1 h to 2 h; and finally drying a resulting washed product to obtain the acid-treated diamond particles.

5. The method of claim 4, wherein the mixed acid is a mixture of sulfuric acid, chromic acid and nitric acid, and a volume ratio of the sulfuric acid to the chromic acid is in a range of 1:0.5 to 1:1 and a volume ratio of the sulfuric acid to the nitric acid is in a range of 1:1 to 1:2; and a mass percentage of the sulfuric acid is in a range of 80% to 98.4%, a mass percentage of the chromic acid is in a range of 50% to 65%, and a mass percentage of the nitric acid is in a range of 50% to 65%.

6. The method of claim 1, wherein in step 2), the reflux reaction is performed at a temperature of 40° C. to 50° C. for 2 h to 4 h.

7. The method of claim 1, wherein in step 3.1), a ratio of a mass of the spherical aluminum oxide particles to a volume of the isopropanol solution is in a range of 1 g: 50 mL to 1 g: 100 mL; in step 3.1), a ratio of the mass of the spherical aluminum oxide particles to a volume of the mixed solution of sodium tetrahydroaluminate and hydrogen peroxide is in a range of 1 g: 5 mL to 1 g: 10 mL; and in step 3.1), the reaction is performed at a temperature of 60° C. to 80° C. under stirring for 1 h to 2 h.

8. A method for using the organic/inorganic hybrid thermally conductive and insulating two-component adhesive prepared by the method of claim 1, comprising the following steps:

in parts by mass, weighing 100 parts of the organic/inorganic hybrid insulating adhesive A component and 50-100 parts of the organic/inorganic hybrid insulating adhesive B component; adding the 50-100 parts of the organic/inorganic hybrid insulating adhesive B component to the 100 parts of the organic/inorganic hybrid insulating adhesive A component, and mixing to obtain the organic/inorganic hybrid thermally conductive and insulating two-component adhesive;

coating the organic/inorganic hybrid thermally conductive and insulating two-component adhesive onto a surface of a material to be bonded, and bonding to obtain a member to be bonded;

subjecting the member to be bonded to defoaming by standing under conditions of vacuum pressure not less than 10-1 Pa and ambient temperature for 5 min to 10 min to obtain a defoamed member to be bonded; and heating the defoamed member to be bonded to a temperature of 80° C. to 100° C. at a heating rate of 5° C./h to 10° C./h, and holding at the temperature of 80° C. to 100° C. for 2 h to 4 h.

9. The method of claim 8, wherein the mixing is performed at a rotation speed of 30 r/min to 50 r/min for 5 min to 10 min; and after the organic/inorganic hybrid thermally conductive and insulating two-component adhesive is coated onto the surface to be bonded, a resulting coating has a thickness of 100 μm to 200 μm.

10. The method of claim 8, wherein the material to be bonded is selected from the group consisting of a wood board, an epoxy resin, a stainless steel, an aluminum alloy and a titanium alloy.

* * * * *